United States Patent
Luz et al.

(10) Patent No.: US 9,321,599 B2
(45) Date of Patent: Apr. 26, 2016

(54) TRANSPORT DEVICE FOR GOODS AND METHOD FOR OPERATING A TRANSPORT DEVICE

(71) Applicant: MALL HERLAN MB GMBH, Neuhausen ob Eck (DE)

(72) Inventors: Uwe Luz, Neuhausen ob Eck (DE); Uwe Reich, Tuttlingen (DE)

(73) Assignee: MALL HERLAN MB GMBH, Neuhausen ob Eck (DE)

( * ) Notice: Subject to any disclaimer, the term of this patent is extended or adjusted under 35 U.S.C. 154(b) by 0 days.

(21) Appl. No.: 14/432,324

(22) PCT Filed: Jun. 6, 2013

(86) PCT No.: PCT/EP2013/061721
§ 371 (c)(1),
(2) Date: Mar. 30, 2015

(87) PCT Pub. No.: WO2014/053253
PCT Pub. Date: Apr. 20, 2014

(65) Prior Publication Data
US 2015/0225183 A1     Aug. 13, 2015

(30) Foreign Application Priority Data

Oct. 1, 2012   (DE) .................. 10 2012 109 316

(51) Int. Cl.
*B65G 47/52*     (2006.01)
*B65G 15/26*     (2006.01)
(Continued)

(52) U.S. Cl.
CPC ............ *B65G 47/5122* (2013.01); *B65G 15/26* (2013.01); *B65G 37/00* (2013.01); *B65G 43/08* (2013.01); *B65G 2203/0291* (2013.01)

(58) Field of Classification Search
CPC ................ B65G 21/12; B65G 41/003; B65G 2203/0291; B65G 47/5127; B65G 47/5131; B65G 47/5122; B65G 43/08; B65G 37/00; B65G 47/52; B65G 47/642; B65G 15/22; B65G 15/26
USPC ...................................................... 198/460.2
See application file for complete search history.

(56) References Cited

U.S. PATENT DOCUMENTS 2,932,376 A * 4/1960 Millington ............. B65G 37/02
198/341.03
5,680,746 A * 10/1997 Hornisch ........... B65G 47/5122
198/345.2

(Continued)

FOREIGN PATENT DOCUMENTS

DE          2006665 A1    9/1970
DE   102009029778 A1    12/2010
(Continued)

*Primary Examiner* — Mark A Deuble
(74) *Attorney, Agent, or Firm* — Bachman & LaPointe, P.C.

(57) ABSTRACT

A transport device for goods, comprising a transfer device for transferring the goods (4) from a delivering conveying device (3) of the transport device to a discharging conveying device (6) of the transport device having an endless transport element (8) which can be driven in a circulating manner, having a first drive (15) for driving a first section (7) of the endless transport element (8), which first section (7) is intended to receive the goods (4) and is assigned to the delivering conveying device (3), and a second drive (17) for driving a second section (16) of the endless transport element (8), which second section (16) is intended to dispense the received goods (4) and is assigned to the discharging conveying device (6), wherein the endless transport element (8) is arranged on a carriage (9) which is held by a carriage carrier, and the carriage (9) can be adjusted along a carriage axis by way of a speed difference between the first and the second drive (15, 17).

15 Claims, 4 Drawing Sheets

(51) Int. Cl.
  *B65G 47/51* (2006.01)
  *B65G 43/08* (2006.01)
  *B65G 37/00* (2006.01)

(56) References Cited

U.S. PATENT DOCUMENTS

| | | | |
|---|---|---|---|
| 6,305,525 B1 * | 10/2001 | Miller ................... | B65G 21/14 |
| | | | 198/460.2 |
| 6,325,198 B1 * | 12/2001 | Pattantyus-Abraham | B65G 37/02 |
| | | | 198/339.1 |
| 6,817,464 B2 | 11/2004 | Biondi et al. | |
| 6,913,135 B2 * | 7/2005 | Borderi ................ | B65G 47/082 |
| | | | 198/418.7 |
| 7,341,141 B2 | 3/2008 | Spatafora | |
| 7,455,168 B2 * | 11/2008 | Monti ................ | B65G 47/5122 |
| | | | 198/347.1 |
| 7,766,158 B2 * | 8/2010 | Laganiere .............. | A01D 57/20 |
| | | | 198/312 |
| 7,941,992 B2 | 5/2011 | Spatafora et al. | |
| 2007/0045083 A1 * | 3/2007 | Hart ...................... | B65G 47/52 |
| | | | 198/418.6 |

FOREIGN PATENT DOCUMENTS

| | | |
|---|---|---|
| DE | 102010029519 A1 | 12/2011 |
| EP | 1375394 A1 | 1/2004 |
| EP | 1721844 A1 | 11/2006 |
| EP | 2036819 A1 | 3/2009 |

* cited by examiner

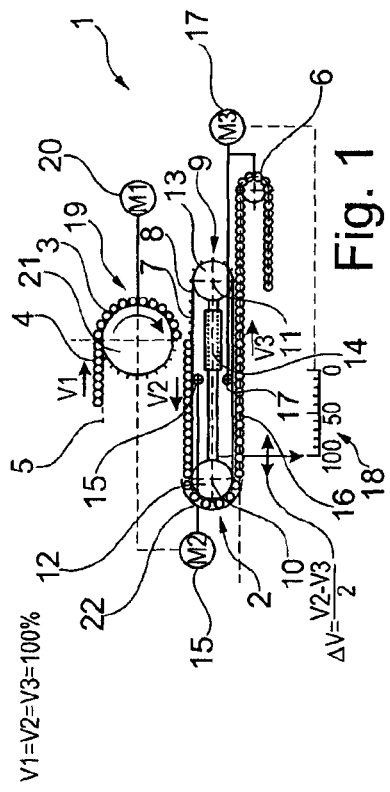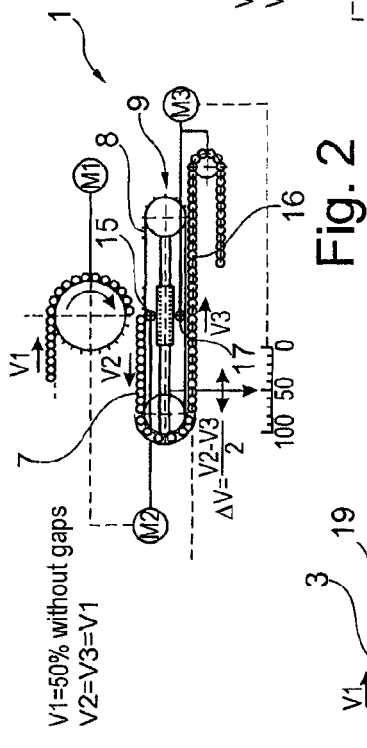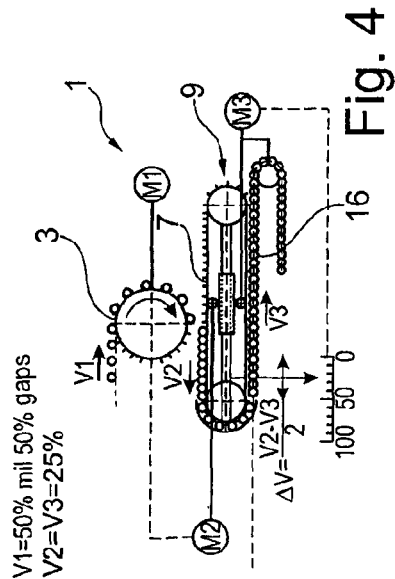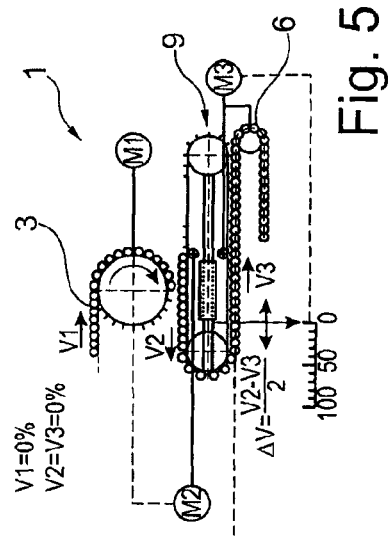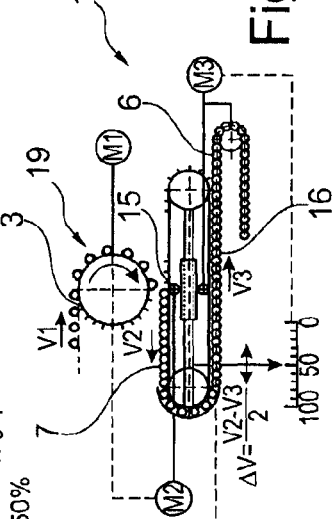

TRANSPORT DEVICE FOR GOODS AND METHOD FOR OPERATING A TRANSPORT DEVICE

BACKGROUND OF THE INVENTION

The invention pertains to a transport device with a transfer device for transferring goods from a delivering conveyor to a discharging conveyor and a method for operating such a transport device.

In the production of cans, tubes and bottles, these goods are transported from workstation to workstation on so-called chain pins. In production lines for goods of this type, the utilization of transfer devices is required because it is not possible to use transport trains of arbitrary length, wherein several transport chain modules that respectively comprise a transport chain with chain pins are used instead such that the transfer of the goods from transport chain to transport chain is absolutely imperative. The transfer devices used usually consist of so-called vacuum drums that remove the goods from a delivering conveyor comprising chain pins and then place the goods on a discharging conveyor comprising chain pins. A transfer device of this type is described, for example, in DE 10 2009 029 778 A1 of the applicant. The disadvantage of known transfer devices can be seen in that a continuous transfer of goods requires a significant deceleration of the discharging conveyor in order to compensate gaps between the goods on the delivering conveyor. This respectively limits the maximum transfer speed and the operating speeds of the conveyors because the discharging conveyor cannot be arbitrarily decelerated and accelerated due to its large inert mass. In addition, significant speed changes of the conveyor result in substantial wear and also entail the risk of losing goods off the chain pins elsewhere due to the jerky motions.

A transport device known from DE 10 2010 029 519 A1 features a transfer device comprising an endless transport element with a first and a second section that can be operated with different speeds, wherein this causes a carriage carrying the endless transport element to be horizontally deflected. The known transport device serves for coupling a continuously operating machine and a cyclically operating machine to one another, wherein the displacement of the carriage makes it possible to alternately generate and once again compensate a throughput loss in dependence on the cycle. In the known device, the first drive for driving the first section intended for receiving continuously delivered goods is mechanically coupled to the continuously operating delivery device, i.e. the speed of the first section of the endless transport element always inevitably corresponds to the speed of the delivering conveyor. A compensation of gaps therefore cannot be realized with the known transport device and is also not mentioned as a problem in this document.

EP 1 721 844 B1 discloses a transport device, in which a displaceable transfer star is arranged between two endless transport elements. The two endless transport elements do not feature sections that are driven with different speeds.

A device without transfer carriage is known from EP 1 375 394 B1, as well as from DE 2 006 665 A1.

Based on the above-described prior art, the invention aims to disclose an improved transport device for transferring goods from a delivering conveyor, particularly with chain pins, to a discharging conveyor, particularly with chain pins, which allows higher maximum speeds of the conveyors and at the same time ensures a largely accurate and continuous transfer of goods. The invention furthermore aims to disclose a method for operating the transport device.

SUMMARY OF THE INVENTION

The objective with respect to the transport device and the method are attained by the present invention.

Advantageous enhancements of the invention are disclosed and the scope of the invention includes all combinations of at least two characteristics disclosed in the description, the claims and the figures.

In order to avoid repetitions, characteristics disclosed with respect to the device are also considered and claimable as being disclosed with respect to the method. Likewise, characteristics disclosed with respect to the method are also considered and claimable as being disclosed with respect to the device.

The invention is based on the notion of providing a transport device with a transfer device that has a circulating, driven endless transport element, particularly an endless transport belt, especially an endless cleated belt, wherein the endless transport element features two sections that preferably lie opposite of one another and preferably are aligned parallel to one another, namely a first section for receiving the goods from a delivering conveyor and a second section for dispensing the received goods to a discharging conveyor. As described below in connection with the inventive transport device, it is preferred that at least one conveyor, preferably both conveyors assigned to the transfer device, features/feature a transport chain that is equipped with chain pins for receiving the goods, particularly cans, bottles, tubes or sleeves. A separate, preferably stationary drive is assigned to each of the sections formed by the endless transport element in order to operate the two sections with different speeds referred to a fixed point of the device and to accelerate and decelerate the sections independently of one another. In order to realize a different driving speed of the endless transport element circulating about common rotational axes, the endless transport element is arranged on a carriage that can be adjusted along a carriage axis in a translatory fashion, wherein different speeds of the two sections of the endless transport element realized by means of the drives result in a displacement of the carriage along the carriage axis, particularly with half the differential speed between the two sections.

In other words, the transfer device comprises a carriage, on which an endless transport element is supported in a circulating fashion, wherein the carriage can be adjusted relative to a carriage carrier along a carriage axis in that two different sections of the endless transport element, which preferably lie opposite of one another and are preferably spaced apart from one another by means of rotational axes of deflection pulleys, are driven with different speeds such that the carriage carries out a compensating motion.

The inventive construction is based on the notion of providing a transfer device that has a small inert mass in comparison with the delivering conveyor and the discharging conveyor and makes it possible to realize considerable speed changes, i.e. significant accelerations and decelerations, that do not directly affect the speed or speed change of the conveyors in order to compensate or minimize gaps between goods on the delivering conveyor. The time, during which the compensating motion takes place, is preferably used for adapting the speed of the second section to the speed of the first section, wherein a driving speed for the second drive or the second section is respectively assigned to each carriage position on the carriage axis as described in greater detail below.

In order to realize a continuous reception of goods, it is preferred, for example, to compensate gaps between goods on a delivering conveyor by means of the first section in that the first drive and therefore the first section of the endless transport element is significantly decelerated and then once again accelerated, particularly to the speed of the delivering conveyor, after one or more gaps have been compensated. This speed change or a speed change of the first section that is not dependent on gaps between goods preferably only has a delayed effect on the speed of the second section of the transport element because the carriage initially carries out a compensating motion along the carriage axis due to the differential speed between the two sections. As described in greater detail below, it is particularly preferred that a change of the carriage position along the carriage axis causes the speed of the second section of the endless transport element and preferably also the speed of the discharging conveyor to change. Due to the compensating motion of the carriage, however, a speed adaptation of the second section and preferably also of the second conveyor does not have to be realized abruptly, i.e. synchronously with the first section, but rather can take place dampened and slower (smoothed with respect to the control technology) such that the second conveyor is altogether protected from wear and higher overall speeds of the delivering and discharging conveyors can be realized.

According to the invention, it is proposed to provide generally known sensor means for detecting gaps between goods on the delivering conveyor, wherein these sensor means are connected in a signaling fashion to control means for the first drive that activate the first drive in dependence on the detection of gaps between goods on the delivering conveyor. The first drive of the transfer device preferably is activated by the control means in such a way that the first section is significantly decelerated after a gap between goods has been detected in order to compensate, i.e. minimize, the at least one gap between goods, particularly gaps between goods, and then accelerated once again in order to make up at least part of the distance traveled within this time period, wherein the first section of the transfer device or of the endless transport element preferably is at least approximately accelerated to the speed of the delivering conveyor.

In case several gaps between goods are detected in succession, it is preferred to stop the first section until they have respectively moved past the first section or the next free gap in the first section to be filled such that goods can be continuously received on the first section. Since the speed of the first section is respectively varied or quite abruptly adapted to the presence of gaps between goods and/or the speed of the delivering conveyor and the second drive changes its driving speed at least not to the same degree or with this speed, a differential speed results between the first and the second section and causes a motion of the carriage along the carriage axis. In order to realize a highly stable overall system, it is particularly preferred that a position change of the carriage along the carriage axis only has a delayed or relatively slow effect on a speed change of the second drive. In other words, the positive and the negative acceleration ramp of the second drive are relatively flat. This particularly results in an at least approximately continuous speed of the second drive despite a potentially intermittent operation of the first drive.

The acceleration ramp of the second drive preferably is realized in such a way that the compensation of a single gap between goods by the first section, i.e. a brief deceleration and re-acceleration of the first section, has no or hardly any effect on the speed of the second drive. The speed of the second drive and therefore of the second section is only adapted if several gaps between good occur in succession and/or the speed of the first drive changes over a longer period of time and the carriage therefore changes its position along the carriage axis over a slightly longer period of time.

According to the invention, the speed of the second drive and therefore of the second section then is adapted to the position of the carriage along the carriage axis as initially mentioned.

It is particularly preferred that both sections, i.e. the first and the second section of the endless transport element, are arranged on two opposite sides of the carriage and aligned parallel to one another as initially indicated. It is particularly advantageous if the first section is situated above the second section such that goods can be transferred to the first section by gravity and once again transferred from the second section to the discharging conveyor by gravity.

Regardless of the arrangement of the sections relative to one another, it is particularly advantageous if holding means for fixing the goods are assigned to the endless transport element in order to ensure a secure transport of the goods from the first to the second section and to prevent the loss of goods. It proved particularly advantageous to hold or fix the goods on the endless transport element, particularly in the second section, with the aid of a vacuum.

As initially indicated, it is particularly advantageous if a functional correlation, particularly a linear correlation, exists between the speed, with which the second section is operated, and the position of the carriage along the carriage axis. According to an enhancement of the invention, this is realized by providing sensor means for indirectly or directly detecting the position of the carriage along the carriage axis, wherein these sensor means are connected in a signaling fashion to control means for the drives assigned to the endless transport belt, and wherein the control means are designed for adjusting a driving speed of the second drive, which is assigned and functionally connected to the second section of the endless transport element, in dependence on the measured or detected position. Additionally or alternatively to acting upon the goods with a vacuum, a rolling or deflecting element, particularly a rounded rolling sheet, is assigned to the endless transport element in order to prevent the goods from falling off, wherein the goods can be supported on and, in particular, roll along this rolling or deflecting element during their transport from the first section to the second section and thereby be prevented from falling out or falling off. The goods then preferably are directly transferred from the second section of the endless transport element to a prismatic belt and placed, particularly pushed, on a transport chain featuring chain pins by this prismatic belt. The conveyor plate and the prismatic belt preferably move in a synchronized fashion. Alternatively to a prismatic belt, it would also be conceivable to realize the transfer with a vacuum drum.

The transport device comprises a transfer device realized in accordance with the inventive concept, wherein the transport device comprises in addition to the transfer device a delivering conveyor featuring, in particular, a transport chain with chain pins, as well as a discharging conveyor featuring, in particular, a transport chain with chain pins, and wherein the delivering conveyor, particularly its transport chain, preferably extends at least sectionally parallel to the preferably upper first section of the transfer device and the discharging conveyor, particularly its transport chain, preferably extends at least sectionally parallel to the particularly lower second section of the transfer device. In other words, the transfer device is arranged relative to the conveyors in such a way that an unproblematic transfer can be realized, particularly over a transfer area (section).

It is particularly preferred that the delivering conveyor comprises a transport chain with chain pins, wherein the goods are in this case transferred from the chain pins to the first section of the endless transport element of the transfer device, for example, by means of a vacuum drum or an alternative transfer device associated with the delivering conveyor. It is additionally or alternatively advantageous if the discharging conveyor comprises a transport chain with chain pins, wherein a transfer device is in this case also provided as part of the discharging conveyor in order to transfer the goods to the chain pins. This can preferably be realized by means of a so-called prismatic belt, wherein the goods are in this case transferred from the second section of the transfer device to prisms of the prismatic belt that preferably moves with the speed of the second section and then laterally transferred to the chain pins. To this end, the goods situated on the prismatic belt, which preferably extends parallel to the second section, can be conveyed against an obliquely arranged element such as, for example, a beam or an obliquely extending belt that ensures the force component in the direction of the chain pins.

According to an enhancement of the invention, it is advantageously proposed that the second drive and a drive of the discharging conveyor are mechanically and/or electronically coupled in such a way that the speed of the second section and the speed of the discharging conveyor are at least approximately identical in order to thusly realize a synchronous motion of the second section and the conveyor, particularly parallel to one another or adjacent to one another over a certain distance, as well as a jerk-free and synchronized goods transfer. As an alternative to coupling two separate drives mechanically and/or electronically, it is also possible to provide a common drive for the second section and the discharging conveyor.

It is particularly advantageous if the transport device features sensor means for indirectly or directly detecting the speed of the delivering conveyor, wherein this may be implemented, for example, by measuring the speed of the first drive. The sensor means are connected in a signaling fashion to control means for the first drive in order to activate the first drive in dependence on the measured variable such as, for example, the speed of the first drive of the delivering conveyor.

In order to configure the transport device for high throughput rates, in particular, in excess of 400 cans per minute, it is on the one hand decisive to realize the transfer device, particularly its moving parts, with the lowest weight possible and to thusly reduce the inert mass to a minimum. In order to ensure optimal smoothness of running and to thereby avoid malfunctions, an enhancement of the invention proposes that the particularly electromotive drives for driving the first and the second section of the endless transport element are respectively coupled to the first and the second section by means of a drive belt, wherein the preferably common drive belt is according to an enhancement arranged such that eccentric forces are reduced to a minimum. To this end, it is proposed that the drive belt is referred to the width of the endless transport element arranged in a region between the two outer longitudinal edges of the transport element, particularly in the center between the two longitudinal edges. This means that the drive belt is situated in an imaginary volume that is on the one hand defined by the first and the second section of the endless transport element and on the other hand by two parallel planes that extend perpendicular to the sections and contain the outer longitudinal edges of the endless transport element. In this case, it is particularly preferred to assign tensioning means to the drive belt, wherein said tensioning means are likewise situated in the above-described volume.

In this context, it is preferred that the drive belt is driven by two drive shafts, wherein one of the drives is respectively assigned to each drive shaft, and wherein the drives are preferably situated in a region outside the endless transport element and extend into the above-described volume. As mentioned above, it is particularly preferred that tensioning means, particularly at least one automatic tensioning device, are assigned to the drive belt and preferably also situated in a region between the longitudinal edges of the endless transport element.

In this case, it is particularly preferred that the drive belt drives a first and a second relay shaft for the endless transport element.

In order to ensure optimal running of the endless transport element, it is preferred to realize the endless transport element in the form of a self-locating toothed belt, wherein the teeth of the toothed belt are preferably driven by the first and/or second drive via at least one of the relay shafts. In order to realize the self-locating function, the toothed belt preferably is on one side provided with a circumferential (endless) groove, into which a guide wheel of the relay shaft engages.

The invention also discloses a method for operating a transport device realized in accordance with the inventive concept, wherein said method is characterized in that the second section of the endless transport belt is driven with at least approximately the same speed as the discharging conveyor. In other words, the second section and the discharging conveyor are driven in a synchronized fashion.

According to another important characteristic of the inventive method, the first section of the endless transport element of the transfer device is driven in dependence on the speed of the delivering conveyor and/or in dependence on the detection of gaps between goods on the delivering conveyor such that goods are continuously received on the first section of the endless transport element of the transfer device despite gaps between goods on the delivering conveyor. All in all, it is particularly advantageous to realize the activation of the preferably stationary first drive and the preferably stationary second drive in such a way that speed changes of the first section take place faster than speed changes of the second section.

According to an enhancement of the inventive method, it is particularly advantageous if the first section is decelerated, particularly to zero, when a gap between goods is detected, wherein the first section is then once again accelerated after the gap between goods has passed, particularly to at least approximately the same speed as the delivering conveyor.

It is particularly advantageous if the second section is driven with a speed that is functionally dependent, in particular linearly dependent, on the position of the carriage along the carriage axis, wherein it is particularly preferred that the maximum travel of the carriage is limited by means of corresponding end stops, and wherein a first end stop characterizes or defines a maximum speed and a second end stop characterizes or defines a minimum speed, particularly zero.

As already described above with reference to the inventive transport device, it is preferred that a speed change of the second section takes place slower than a preceding speed change of the first section in order to continuously receive goods in case of a gap between goods of the delivering conveyor. This means that the first drive for compensating a gap between goods is decelerated more intensely than a preferably position-dependent reduction of the speed of the second section. Alternatively or additionally, the acceleration of the first section for catching up with the delivering conveyor takes place faster than a potential speed increase of the second section. The preceding explanations apply analogously to the adaptation of the speed of the first section to a varying speed of the delivering conveyor. The reaction of the first drive is immediate, i.e. the speed of the first section changes faster than the speed of the second section, which is preferably adapted in a delayed fashion, particularly in dependence on the changing position of the carriage along the carriage axis due to a differential speed between the first and the second section. The differential speed occurs due to the fact that a speed change of the second section does not take place simultaneously with or with the same speed as the adaptation of the speed of the first section to the speed of the delivering conveyor.

BRIEF DESCRIPTION OF THE DRAWINGS

Other advantages, characteristics and details of the invention are disclosed in the following description of preferred exemplary embodiments, as well as the drawings.

In these drawings:

FIG. 1 shows a schematic illustration of a transport device for goods, particularly cans, with a transfer device, to which the goods are transferred from a delivering conveyor and from which these goods can be transferred to a discharging conveyor, namely at the maximum speed of the delivering conveyor, at an adapted maximum speed of the first section of the endless transport element of the transfer device, as well as at the maximum speed of the second section of the endless transport element and of the discharging conveyor;

FIG. 2 shows a different operating state of the transport device than in FIG. 1 at half the maximum speed of the delivering conveyor;

FIG. 3 shows another operating state at the maximum speed of the delivering conveyor, wherein it is assumed, however, that there are 50% gaps between goods on the delivering conveyor;

FIG. 4 shows yet another different operating state than in the preceding figures at half the maximum speed of the delivering conveyor and at the same time 50% gaps between goods on the delivery conveyor;

FIG. 5 shows another operating state, in which the delivering conveyor is stationary;

DETAILED DESCRIPTION

Figure 6:
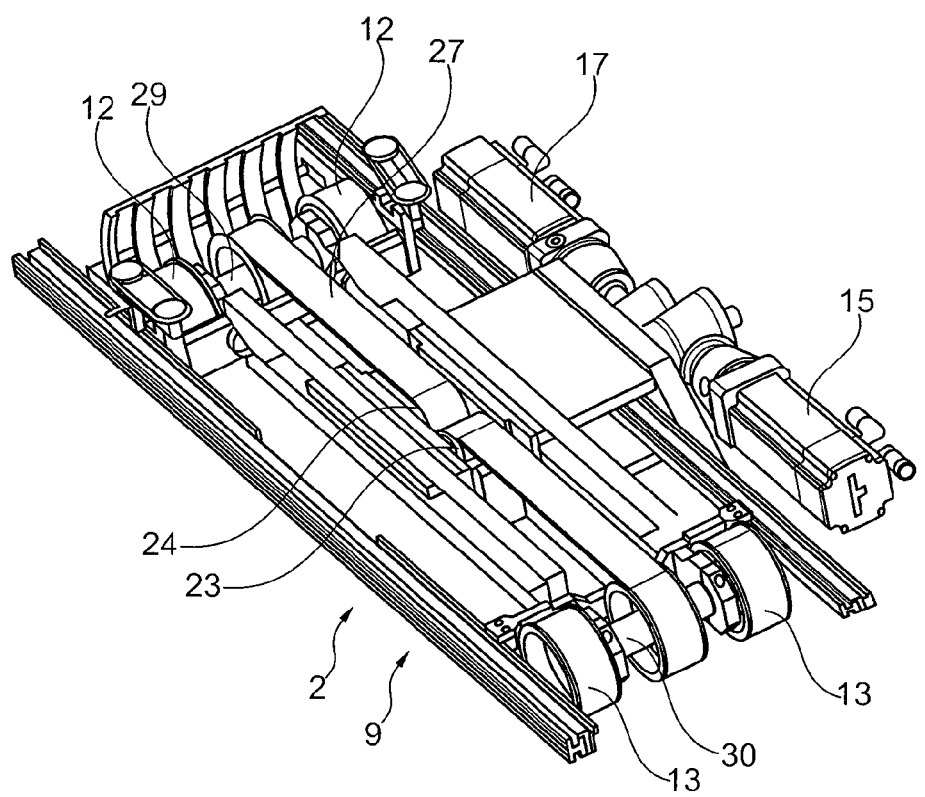
FIG. 6 shows an illustration of a carriage of a transfer device without endless transport element in order to elucidate the position of drive belts.

In the figures, identical elements and elements with identical function are identified by the same reference symbols.

FIGS. 1 to 5 show a transport device 1 that comprises a transfer device 2. The transport device 1 comprises a delivering conveyor 3 for goods 4, particularly in the form of cans or can blanks, wherein the delivering conveyor 3 comprises a transport chain 5 with not-shown chain pins in the exemplary embodiment shown. The transport device 1 furthermore comprises a discharging conveyor 6 that is also realized in the form of a transport chain with chain pins, wherein the goods 4 are transferred from the delivering conveyor 3 to an upper first section 7 of an endless transport element 8, in this case a cleated belt of the transfer device 2, and wherein the goods 4 are transported from the first section 7 to a second lower section extending parallel to the first section, from which the goods are transferred to the discharging conveyor 6. In addition to the transport chain 5 with chain pins, the delivering conveyor furthermore comprises a transfer device 21 that is realized in the form of a vacuum drum in the exemplary embodiment shown and serves for carrying out the transfer of the goods from the chain pins to the first section 7. The discharging conveyor 6 also comprises a transfer device in the form of a prismatic belt that is not illustrated in detail and onto which the goods 4 from the second section are placed. For example, the goods 4 are then acted upon with a force perpendicular to the transport direction by means of an obliquely extending belt and thereby laterally pushed onto the chain pins of the transport chain of the discharging conveyor. FIG. 1 furthermore shows that a rolling element 22 in the form of a bent rolling sheet is provided in the transition region between the first and the second section in order to prevent the goods 4 from falling off during the transfer from the first to the second section. Immediately after passing the rolling element 22, the goods fall/roll onto the prismatic belt, by means of which they are laterally transferred onto the chain pins of the transport chain of the discharging conveyor.

The transfer device 2 comprises a carriage 9 that can be adjusted in a translatory fashion from the left toward the right along a carriage axis in the plane of projection, wherein the endless transport element 8 is supported on said carriage such that it is rotatable about two rotational axes 10, 11. The rotational axes 10, 11 are formed by two deflection pulleys or rollers 12, 13 that are rotatably supported on the carriage. A carriage mount 14 is merely indicated in the figures and defines a fixed point or immovable point of the entire device, relative to which the cited speeds are measured or to which these speeds refer, respectively.

A first, preferably stationary drive 15 is assigned to the first section 7 intended for receiving goods and a second, preferably stationary drive 17 is assigned to the second section 16 of the endless transport element 8, wherein the drives 15, 17 are realized, for example, in the form of electric stepping motors. The adjusting motion of the carriage 9 is exclusively realized due to a differential speed between the first and second sections 7, 16, i.e. no independent carriage drive is provided separately of the drives assigned to the sections 7, 16—the carriage therefore only carries out an automatic compensating motion.

The drives 15, 17 either act directly upon the sections 7, 16 or upon a transmitter assigned thereto such as, for example, a toothed belt that may be directly coupled or functionally connected to the endless transport element 8, for example, by means of the deflection pulleys 12, 13.

The transfer device 2 furthermore comprises merely indicated sensor means 18 for detecting the position of the carriage 9 along the carriage axis, wherein this may be realized, for example, in a potentiometric fashion. The transport device 1 furthermore comprises sensor means 19 for detecting the speed of the delivering conveyor 3, as well as for detecting gaps between goods. The sensor means 18, 19 are connected in a signaling fashion to not-shown control means of the drives 15, 17 in order to activate the drives 15, 17 in dependence on detected variables.

The exemplary embodiment according to FIG. 1 shows an optimal state. The delivering conveyor 3 operates at its maximum speed v1. The speed of the upper first section 7 corresponds to this speed. The carriage is in an end position, in this case the left end position, to which a maximum speed v3 of the second section is assigned. Since the second drive 17 and the drive of the discharging conveyor 6 are realized in the form of a common drive, the second section 17 and the conveyor 6, particularly its transport chain, move with the same speed—i.e. a synchronous motion is realized. Alternatively, separate drives may be mechanically or electronically synchronized.

The operating state illustrated in FIG. 2 occurs, for example, when a delivering machine only operates at half speed for whatever reasons. Consequently, the delivering conveyor 3 is operated at half its maximum speed. In this specific instance, the delivering conveyor 3 is continuously filled without gaps. The speed of the delivering conveyor 3 is determined with the aid of the sensor means 19 and the control means activate the first drive 15 in such a way that the speed v2 of the first section 7 of the endless transport element 8 corresponds to the speed v1.

Since the second section 16 was initially still operated with the original maximum speed (see FIG. 1), this results in a rightward compensating motion of the carriage 9 along the carriage axis into the central position shown, to which half the maximum speed is assigned in this specific exemplary embodiment. Consequently, the control means activate the second drive 17 accordingly such that the following applies to the exemplary embodiment according to FIG. 2: v2=v3=v1.

In the exemplary embodiment according to FIG. 3, the delivering conveyor 3 operates at its maximum speed v1, but every second transport space on the delivering conveyor 3 is unoccupied, i.e. there are 50% gaps between goods. This is detected by the sensor means 19 and the drive 15 consequently is operated intermittently such that the first section 7 is decelerated and accelerated again and again, wherein the gap between goods is compensated due to the deceleration and the first section subsequently is once again accelerated to the speed of the delivering conveyor 3 in order to continuously receive the goods on the first section 7 as shown and consequently to continuously transfer the goods from the second section 16 to the discharging conveyor. The second section is not driven intermittently such that the carriage continuously carries out an intermittent compensating motion due to the intermittent operation of the first drive.

In the exemplary embodiment according to FIG. 3, the carriage was displaced into a central position due to the initial differential speed such that the speed v3 of the second section corresponds to a mean or average speed (averaged over the deceleration and acceleration processes of the first section 7).

In the operating state illustrated in FIG. 4, the delivering conveyor 3 is operated at half its maximum speed. At the same time, every second goods transport space is unoccupied, i.e. there are 50% gaps between goods. The carriage is displaced farther rightward along the carriage axis than in the exemplary embodiments according to FIGS. 2 and 3. After the first compensating motion of the carriage, the speed of the first section (averaged over the intermittent operating mode) corresponds to the quasi-continuous, non-intermittent speed of the second section 16.

The more or less continuous speed of the second section is realized despite an intermittent operating mode of the first section (and a resulting intermittent change of the carriage position) in that the acceleration ramp of the second drive is not as steep as that of the first drive. In this way, a position change of the carriage, i.e. of the entire belt body, has a slower or delayed effect.

In FIG. 5, the delivering conveyor 3 has come to a standstill. After the carriage 9 carries out the compensating motion, it is situated at the end stop that lies opposite of the end stop according to FIG. 1 and to which a zero speed of the second section and therefore also of the discharging conveyor 6 is assigned. The entire transport device 1 is at a standstill.

Figure 7:
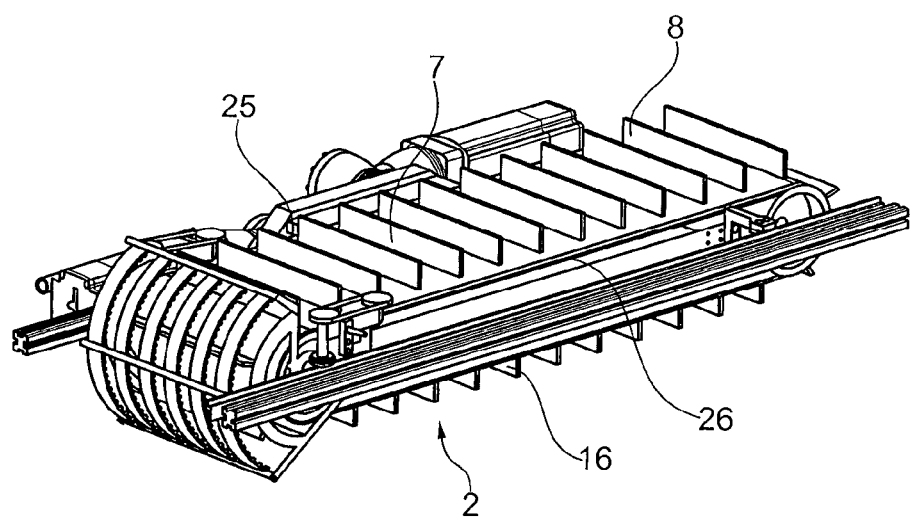
FIG. 7 shows the transfer device according to FIG. 6 with endless transport element.
Figure 8:
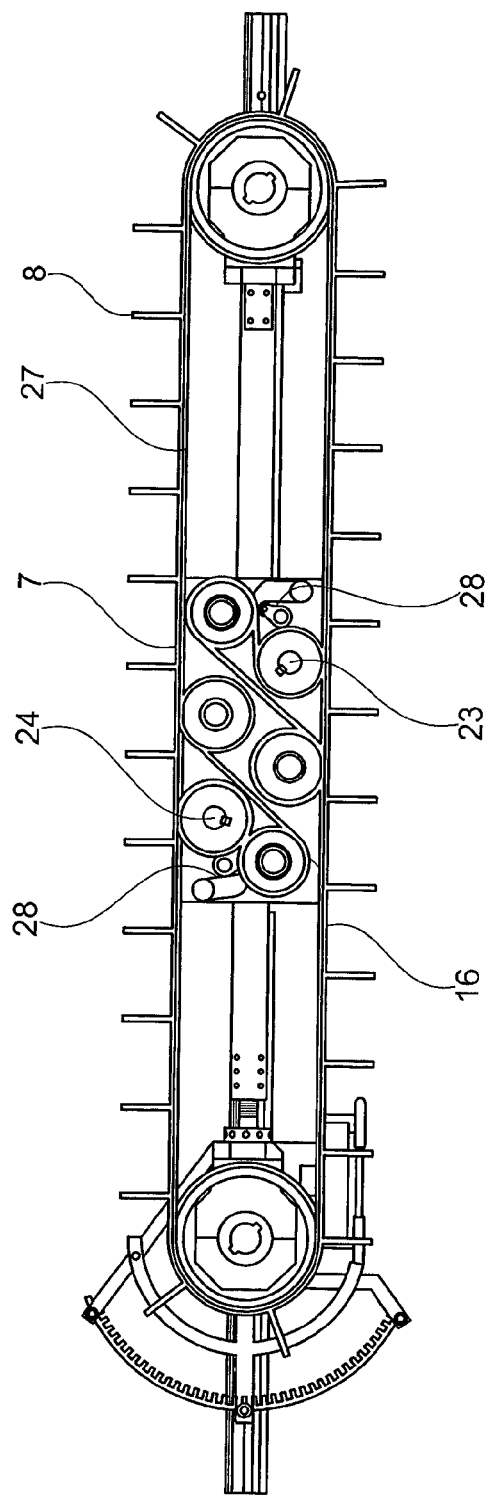
FIG. 8 shows a sectional view of the transfer device that elucidates the preferred position of the drive belt.

FIGS. 6 to 8 show a preferred exemplary embodiment of a transfer device 2 for a transport device that is illustrated in an exemplary fashion in FIGS. 1 to 5. These figures show a carriage 9 that can be adjusted relative to the carriage mount and the stationarily arranged drives. In the exemplary embodiment shown, the two drives 15, 17 are realized in the form of servomotors that respectively drive a drive shaft (first drive shaft 23; second drive shaft 24) and arranged stationarily relative to a carriage mount. The drive shafts 23, 24 extend from beyond an endless transport element 8, which is illustrated in FIGS. 7 and 8, but not in FIG. 6, into a region between the first and the second section 7, 16 of the endless transport element 8, namely as far as a central point referred to two circulating outer longitudinal edges 25, 26 of the endless transport element 8.

A common drive belt 27 is coupled to the two drive shafts 23, 24 in order to drive the first and the second section 7, 16 of the endless transport element. The figures show that the entire common drive belt 23 is situated in a region between the two sections 7, 16 of the endless transport element, as well as in a region between the longitudinal edges 25, 26 of the endless transport element referred to the width of the endless transport element 8.

The figures furthermore show that the drive belt 27 is situated centrally between the longitudinal edges 25, 26 of the endless transport element referred to the width of the endless transport element in order to thereby preclude eccentric forces. Tensioning means 28 (see FIG. 8) are likewise situated within the region (volume) encompassed by the endless transport element.

According to a synopsis of FIGS. 6 to 8, the drive belt 27 drives a first relay shaft 29 with its deflection pulleys 12 for the endless transport element 8 that defines the first rotational axis 10, as well as a second relay shaft 30 with its deflection pulleys 13 that defines the second rotational axis 11. In this case, the toothed drive belt is synchronized with and extends around the relay shaft. The figures do not show the teeth of the deflection pulleys 12, 13 for the endless transport element realized in the form of a toothed belt. FIG. 8 shows quite well that the first drive 15 acts upon the drive belt 27 in a tractive fashion via a first drive shaft 23 that is driven clockwise in the figure and consequently drives the upper first section 7 of the endless transport element that cooperates with the delivering conveyor. The second drive (with the second drive shaft 24) therefore is assigned to the second section.

The invention claimed is:

1. A transport device for goods, comprising a transfer device that serves for transferring the goods (4) from a delivering conveyor (3) of the transport device to a discharging conveyor (6) of the transport device and features an endless transport element (8) that is driven in a circulating fashion, a first drive (15) for driving a first section (7) of the endless transport element (8) for receiving the goods (4) and assigned to the delivering conveyor (3) and a second drive (17) for driving a second section (16) of the endless transport element (8) for dispensing the received goods (4) and assigned to the discharging conveyor (6), wherein the endless transport element (8) is arranged on a carriage (9) that is held by a carriage carrier and the carriage (9) is adjusted along a carriage axis due to a differential speed between the first and the second section (15, 17), and sensor means (20) for detecting gaps between goods on the delivering conveyor (3), and wherein control means are designed for adjusting the speed of the first section in dependence on the detection of gaps between goods by the sensor means.

2. The transport device according to claim 1, wherein the first and the second section (7, 16) are arranged parallel to one another.

3. The transport device according to claim 1, wherein further sensor means (18) are provided for detecting the position of the carriage along the carriage axis and connected in a signaling fashion to control means for the drives, wherein the control means are designed for adjusting the driving speed of the second section (17) in dependence on the detected position.

4. The transport device according to claim 1, further including holding means for fixing the goods (4) on the endless transport element (8) by acting upon the goods with a vacuum.

5. The transport device according to claim 1, wherein at least one of the delivering conveyor (3) features a transport chain (5) with chain pins and the discharging conveyor (6) features a transport chain (5) with chain pins.

6. The transport device according to claim 1, wherein the second drive (17) and a drive of the discharging conveyor (6) are coupled to a common drive such that the speed of the second section (16) and the speed of the discharging conveyor (6) are identical.

7. The transport device according to claim 1, wherein the sensor means (20) further detects the speed of the delivering conveyor (3) and control means for adjusting the speed of the first section (7) in dependence on the detected speed are provided.

8. The transport device according to claim 7, wherein the control means are designed for activating the first drive (15) for decelerating to a zero speed of the first section (7) and thereafter accelerating to the speed of the delivering conveyor (3), in order to fill gaps between goods.

9. The transport device according to claim 1, wherein the first and the second drive (15) are coupled to the first and the second section (7, 16) of the endless transport element by means of a drive belt (27) that is entirely arranged in a region between two parallel outer longitudinal edges of the endless transport element, in the center referred to the width of the endless transport element.

10. The transport device according to claim 9, wherein the drive belt (27) is arranged such that it extends around and drives two relay shafts (29, 30) for the endless transport element.

11. The transport device according to claim 1, wherein the endless transport element (8) comprises a self-locating toothed belt that comprises a V-shaped guide groove.

12. A method for operating a transport device (1) according to claim 1, including the following steps:
  (a) synchronously driving the second section of the endless transport element (8) of the transfer device (2) and the discharging conveyor (3); and
  (b) driving the first section (7) of the endless transport element (8) of the transfer device (2) in dependence on the detection of gaps between goods on the delivering conveyor (3) such that goods (4) are continuously received by the first section (7) of the endless transport element (8) of the transfer device (2) despite gaps between goods on the delivering conveyor (3).

13. The method according to claim 12, wherein the first section (7) is decelerated when a gap between goods is detected, and the first section (7) is then once again accelerated to the same speed as the delivering conveyor (3) after the gap between goods has passed.

14. The method according to claim 13, wherein the second section (16) is operated with a speed that is linearly dependent on the position of the carriage (9) along the carriage axis.

15. The method according to claim 12, wherein a speed change of the first section (16) is greater than a speed change of the second section (7) in order to continuously receive goods (4) in case of a gap between goods on the delivering conveyor (3).

* * * * *